March 14, 1967     B. WONG     3,308,668
TEMPERATURE RESPONSIVE ACTUATOR APPARATUS
Filed March 27, 1964
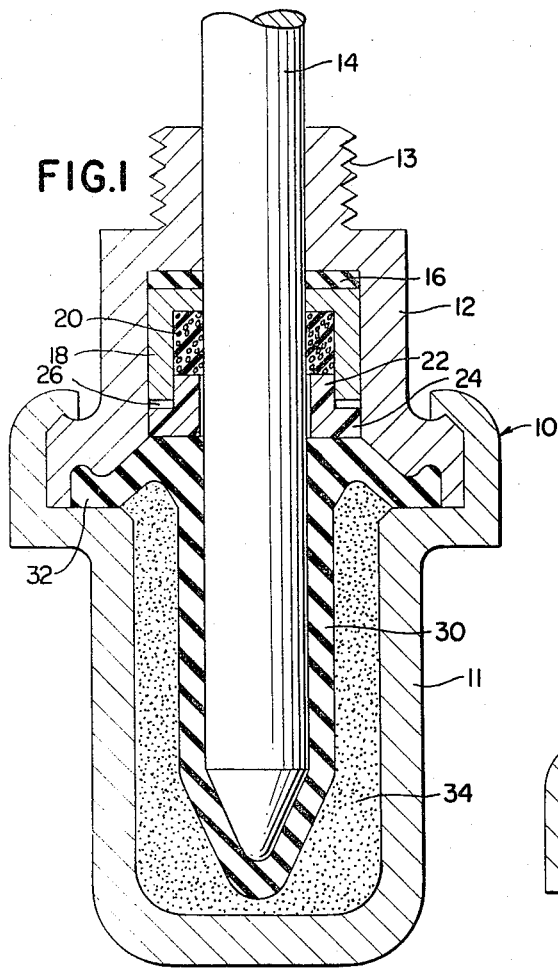
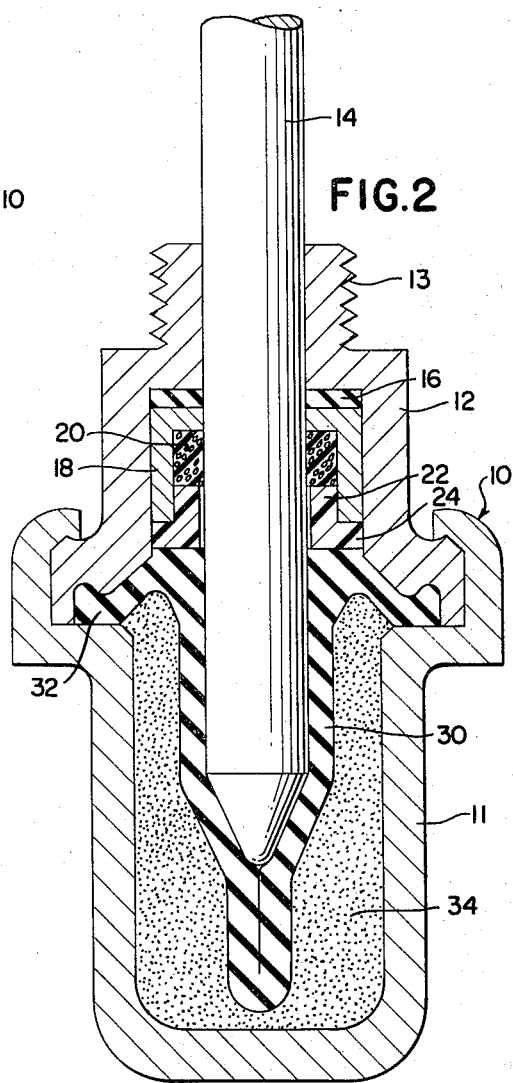
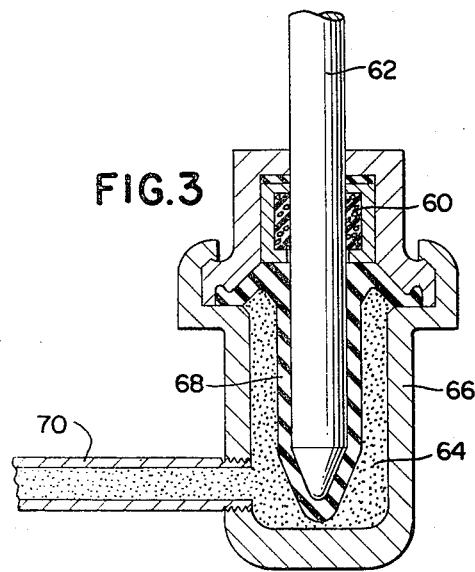
INVENTOR.
BACKMAN WONG
BY William R Jacox
HIS ATTORNEY

United States Patent Office 3,308,668
Patented Mar. 14, 1967

3,308,668
TEMPERATURE RESPONSIVE ACTUATOR
APPARATUS
Backman Wong, Wayland, Mass., assignor to Standard-Thomson Corporation, Waltham, Mass., a corporation of Delaware
Filed Mar. 27, 1964, Ser. No. 355,189
11 Claims. (Cl. 73—368.3)

This invention relates to actuator apparatus. The invention pertains more particularly to actuator apparatus of the type which includes a reciprocally movable member such as a reciprocally axially movable shaft or the like.

The invention relates still more particularly to thermally responsive and/or pressure responsive actuator apparatus.

A problem has long existed in regard to actuator apparatus which includes an axially reciprocally movable actuator shaft or rod. It has been found that actuator apparatus having a reciprocally movable rod has been subject to considerable wear of the rod and the parts engaged by the rod. For example, actuator apparatus such as shown in Pat. No. 2,806,375 includes an actuator rod which is encompassed by an elastomeric sealing member. The elastomeric sealing member squeezes upon the actuator rod during operation of the device. Therefore, very high frictional forces exist between the elastomeric material and the actuator rod during operation of the actuator device. Therefore, shortened life of the actuator unit has resulted.

It is an object of this invention to provide means for automatic lubrication of an actuator rod which is a component of an actuator unit so that frictional forces within such an actuator unit are reduced.

Other objects and advantages reside in the construction of parts, the combination thereof, the method of manufacture, and the mode of operation, as will become more apparent from the following description.

In the drawing:

FIGURE 1 is a longitudinal sectional view of actuator apparatus of this invention.

FIGURE 2 is a longitudinal sectional view, similar to FIGURE 1, showing elements of the apparatus in positions of operation.

FIGURE 3 is a longitudinal sectional view, drawn on a smaller scale, of other actuator apparatus of this invention.

Referring to the drawing in detail, actuator apparatus of this invention comprises a rigid container or housing 10, shown in FIGURES 1 and 2. The container 10 has a main portion 11 and an end portion 12. The end portion 12 is shown as having a threaded part 13 which may be used for connection of the housing 10 to any suitable element or structure. An actuator rod or shaft 14 extends into the main portion 11 of the container 10 through the end portion 12 and is axially reciprocally movable with respect thereto. A disc 16 is shown within the end portion 12 encompassing the actuator rod 14 and may be used for sealing purposes, if desired. Also, within the end portion 12 is a cup-shaped retainer or lubricant reservoir 18 which encompasses the actuator rod 14.

Within the cup-shaped retainer 18 is a body 20 of porous spongy material or the like which forms a wick or the like which carries a quantity of lubricant material. However, within the purview of this invention a quantity of lubricant material may be disposed within the cup-shaped retainer 18 and adjacent the actuator rod 14 without the use of a carrier such as the body 20 of porous material.

Extending into the cup-shaped retainer 18 and movable with respect thereto is a sleeve or piston 22 which encompasses the actuator rod 14. The sleeve or piston 22 has a collar 24 which is engageable with the retainer 18 to limit the movement of the piston 22 with respect to the retainer 18. Normally, a space 26 separates the collar 24 from the end of the retainer 18, as shown in FIGURE 1.

Encompassing the actuator rod 14 within the main portion 11 of the container 10 is a sealing member, herein shown in the form of an elastomeric boot 30 having a flange 32. The flange 32 is secured between the main portion 11 and the end portion 12 and, in effect, separates the main portion 11 of the container 10 from the end portion 12 thereof. A part of the flange 32 engages the collar 24 of the sleeve or piston 22. The boot 30 and the flange 32 thereof, serve as wall means, a portion of which is movable, within the container 10.

Also, within the main portion 11 of the container 10 and exterior of the boot 30 is a body of pressure producing material 34. Herein, the pressure producing material 34 is shown as being a thermally responsive material and may be any element or combination of elements giving the material the physical property characteristic of a high coefficient of expansion over a given temperature range. However, the material 34 may be any material which is capable of exerting substantial pressures within the container 10 by increase in the volume of the material 34 within the container 10.

The elements of the actuator apparatus are normally positioned in the manner shown in FIGURE 1. However, when the container 10 is subjected to increased temperatures, heat is added to the material 34 and the volume of the expansible-contractible material 34 increases. Volumetric expansion of the material 34 results in application of pressure to the boot 30 of elastomeric material. Such application of pressure upon the boot 30 causes the boot 30 to urge the actuator rod 14 to move in a direction from the container 10. Thus, there is relative movement between the container 10 and the actuator rod 14, as shown in FIGURE 2.

When the volume of the body of material 34 within the container 10 increases, pressure is also applied to the flange 32 of the boot 30, as well as to all other portions of the boot 30. When such pressure is applied to the flange 32, the portion of the flange 32 which is in engagement with the collar 24 of the piston 22 is moved toward the cup-shaped retainer 18. Thus, pressure upon the flange 32 causes a portion thereof to move the sleeve or piston 22 toward the retainer 18.

Such movement of the piston 22 toward the retainer 18 causes the piston 22 to apply pressure upon the porous body 20 which is within the cup-shaped retainer 18. Thus, the piston 22 causes lubricant material within the body 20 of porous material to be squeezed from the body 20 of porous material. Movement of the piston 22 into the retainer 18 is limited by engagement of the collar 24 of the piston 22 with the end of the retainer 18, as shown in FIGURE 2.

The lubricant which is dispensed from the body 20 of porous material moves onto the actuator rod 14 and lubricates the actuator rod 14. Thus, frictional forces between the actuator rod 14 and the elements engaging the rod 14 are greatly reduced.

Therefore, it is understood that the pressure material 34 moves the actuator rod 14 and also causes lubrication of the actuator rod 14. Thus, lubrication of the actuator rod 14 is performed automatically with movement of the actuator rod 14. Therefore, frictional forces upon the actuator rod 14 are reduced. Thus, the life of the actuator apparatus is greatly extended.

FIGURE 3 shows other actuator apparatus of this invention in which a wick 60 or the like is provided with lubricant material. The wick 60 slidably encompasses an actuator rod 62. The lubricant material moves onto the actuator rod 62 as the actuator rod 62 reciprocally slidably moves with respect to the wick 60. Thus, the lubricant material is applied to the actuator rod 62 with movement thereof.

Pressure producing material 64 within a container 66 is used to provide a force upon an elastomeric boot 68 which, in turn, applies a force upon the actuator rod 62. FIGURE 3 shows that the pressure producing material 64 is introduced into the container 66 through a conduit 70. The volume of the material 64 within the container 66 may thus be increased by forcing additional material 64 through the conduit 70. The introduction of additional pressure producing material 64 within the container 66 increases the pressure of the material 64 within the container 66 and forces relative movement between the actuator rod or shaft 62 and the container 66.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described the invention, the following is claimed:

1. Actuator apparatus comprising a container provided with a wall having an opening therethrough,
   an actuator rod extending into the container through the opening,
   an elastomeric sealing member within the container and encompassing the actuator rod, the elastomeric sealing member having a portion spaced from said wall and movable toward and away from the wall,
   a piston encompassing the actuator rod and engaging said portion of the elastomeric sealing member, the piston being intermediate the wall and said portion of the elastomeric sealing member,
   a porous sponge-like wick member provided with lubricant material therein, the wick member being disposed intermediate the piston and the wall, the wick member encompassing the actuator rod and liberating lubricant upon the actuator rod when squeezing action of the wick member occurs,
   pressure means within the container and operable to move said portion of the elastomeric sealing member toward said wall, the pressure means also being operable to force the actuator rod in a direction from the container, movement of said portion of the elastomeric sealing means causing movement of the piston toward the wick member and causing squeezing action upon the wick member so that lubricant material is liberated from the wick member and moves to the actuator rod as operation of the pressure means occurs.

2. Actuator apparatus comprising:
   a rigid container, provided with a wall having an opening therethrough,
   a rod extending into the container through the opening and reciprocally axially movable with respect to the container,
   a body of porous sponge-like material within the container and encompassing the rod,
   lubrication material carried by the body of porous material, lubrication material moving from the porous material to the rod upon application of pressure to the porous material,
   a piston encompassing the rod and axially movable with respect thereto, the piston being engageable with the body of porous material,
   pressure responsive means within the container and operable upon the rod and upon the piston for axial movement thereof with respect to the container, such movement of the piston causing application of pressure upon the body of porous material and causing movement of lubrication material from the body of porous material to the rod.

3. Actuator apparatus comprising:
   a container provided with a wall having an opening therethrough,
   a rod extending into the container through the opening, the rod being reciprocally axially movable with respect to the container,
   lubrication means within the container and disposed adjacent the rod and operable to lubricate the rod, the lubrication means including lubricant material which flows from the lubrication means to the rod as the lubrication means operates,
   pressure responsive means within the container, the pressure responsive means being operable upon the rod to force relative movement between the rod and the container, the pressure responsive means also being operable upon the lubrication means for flow of lubrication material to the rod from the lubrication means.

4. Actuator apparatus comprising:
   a wall provided with an opening therethrough,
   a rod extending through the opening of the wall and axially reciprocally movable with respect to the wall,
   elastomeric sealing means having a part engaging the wall and a part encompassing the rod at one side of the wall,
   lubrication means encompassing the rod and disposed intermediate a portion of the sealing means and the wall, the lubrication means having lubricant material therein, the lubrication means being operable to discharge lubricant material therefrom for flow of the lubricant material to the rod for lubrication thereof,
   pressure application means on the said one side of the wall, the pressure application means forcing movement of said portion of the sealing means,
   operator means adjacent the lubrication means and engageable by the said portion of the sealing means and movable thereby to operate said lubrication means to discharge lubricant material therefrom for flow of the lubricant material to the rod.

5. Actuator apparatus comprising:
   a rigid container having a wall provided with an opening therethrough,
   a rod extending into the container through the opening,
   thermally responsive expansible-contractible material within the container and encompassing the rod,
   an elastomeric sealing member separating the rod from the thermally responsive expansible-contractible material, a portion of the sealing member engaging the rod for movement thereof,
   a body of porous material within the container and encompassing the rod, the body of porous material being intermediate the wall and the sealing member,
   lubrication material carried by the body of porous material, some of the lubrication material moving from the body of porous material to the rod by application of pressure upon the porous material,
   piston means encompassing the rod and disposed intermediate the body of porous material and the sealing member, the piston means being engageable by a portion of the sealing member for movement thereby,
   expansion of the thermally responsive expansible-contractible material causing the thermally responsive material to apply pressure to the sealing member so that a portion of the sealing member moves the rod and a portion of the sealing member moves the piston means, movement of the piston means causing application of pressure upon the porous material and causing some of the lubrication material to move from the body of porous material to the rod.

6. Actuator apparatus comprising:
a container having a wall provided with an opening therethrough,
thermally responsive expansible-contractible pressure material within the container,
an actuator rod extending into the container and axially reciprocally movable with respect thereto,
lubrication means adjacent the actuator rod within the container and operable to lubricate the actuator rod,
a piston adjacent the lubrication means and movable with respect thereto, the piston operating the lubrication means by movement of the piston with respect to the lubrication means,
elastomeric means within the container and adjacent the actuator rod, the elastomeric means having a movable portion engageable by the thermally responsive expansible-contractible pressure material for movement thereby upon expansion thereof, said portion of the elastomeric means being engageable with the piston for movement thereof with respect to the lubrication means for lubrication of the actuator rod.

7. Actuator apparatus comprising:
a reciprocally linearly movable shaft,
lubrication means encompassing the shaft and operable to lubricate the shaft,
the shaft and the lubrication means being relatively axially movable,
a piston encompassing the shaft and movable with respect to the lubrication means for operation thereof,
pressure means for linearly moving the shaft with respect to the lubrication means and for movement of the piston with respect to the lubrication means for operation thereof to lubricate the shaft.

8. Actuator apparatus comprising:
a housing having a main portion and an end portion, the end portion having an opening therein,
an actuator shaft extending into the main portion of the housing through the opening in the end portion, the actuator shaft being axially movable with respect to the housing,
an elastomeric sealing member encompassing the actuator shaft and secured between the end portion and the main portion of the housing,
a piston within the end portion of the housing and encompassing the shaft and axially movable with respect thereto,
the sealing member having a movable portion engageable with the piston for movement thereof,
abutment means within the end portion of the housing engageable by the piston for limiting movement of the piston,
a body of porous material retained within the end portion of the housing and slidably encompassing the shaft,
a quantity of lubricant material carried by the porous material,
the piston being engageable with the body of porous material to apply pressure thereto to force lubricant material from the body of porous material to the actuator shaft,
thermally responsive pressure material within the main portion of the container and expansible in volume to move the actuator shaft in a direction from the housing, the thermally responsive pressure material also being expansible in volume to move said portion of the sealing member for movement of the piston, movement of the piston causing pressure to be applied to the porous material and forcing lubricant material from the body of porous material to the shaft.

9. In an actuator device provided with a housing, an actuator rod reciprocally axially movable with respect to the housing, an elastomeric sealing member partially covering the actuator rod, pressure material within the housing operable upon the elastomeric sealing member to cause relative movement between the actuator rod and the housing, lubrication means for lubrication of the actuator rod comprising:
a porous sponge-like liquid carrier adjacent the actuator rod,
lubrication material carried by the carrier,
piston means engageable with the porous sponge-like liquid carrier and movable with respect thereto for compression thereof,
the elastomeric sealing member having a movable portion adjacent the piston means for movement thereof,
operation of the pressure material causing movement of said movable portion of the elastomeric sealing member and causing movement of the piston means so that the piston means engages the sponge-like carrier and compresses the sponge-like carrier so that lubrication material is forced to move from the sponge-like carrier to the actuator rod as the pressure material operates.

10. In actuator apparatus,
support structure,
a reciprocally axially movable rod member carried by the support structure,
an elastomeric boot snugly partially covering the rod member, the boot having a flange encompassing the rod member and having a peripheral portion attached to the support structure, the flange having a movable portion intermediate the rod member and the peripheral portion,
lubrication means encompassing the rod member and operable thereupon for lubrication thereof, the lubrication means including lubricant material which flows from the lubrication means to the rod member as the lubrication means operates,
operator means for operation of the lubrication means, the operator means being engageable with the lubrication means and the movable portion of the flange and operable by movement of the movable portion of the flange.

11. Actuator apparatus of the type having a housing, an axially reciprocally movable shaft extending into the housing, pressure material within the housing, the improvement comprising:
a lubricant reservoir encompassing the shaft,
lubrication material within the reservoir and movable to the shaft for lubrication thereof,
piston means encompassing the shaft and movable into the reservoir for urging movement of the lubrication material from the reservoir to the shaft,
the pressure material being operable to axially move the shaft and the piston means so that the shaft is moved and lubricated by operation of the pressure material.

References Cited by the Examiner

UNITED STATES PATENTS

| | | | |
|---|---|---|---|
| 2,208,149 | 7/1940 | Vernet | 73—368.3 |
| 2,994,223 | 8/1961 | Woods | 73—368 |
| 3,045,918 | 7/1962 | Woods | 236—34 |

LOUIS R. PRINCE, *Primary Examiner.*

J. RENJILIAN, *Examiner.*